United States Patent [19]

Meldahl et al.

[11] 4,056,203
[45] Nov. 1, 1977

[54] PLATFORM LIFT

[75] Inventors: Robert D. Meldahl, Granville; Raymond L. Smalley, Carey, both of Ohio

[73] Assignee: Reb Manufacturing Inc., Carey, Ohio

[21] Appl. No.: 732,605

[22] Filed: Oct. 15, 1976

[51] Int. Cl.² ............................................. B60P 1/44
[52] U.S. Cl. .............................. 214/75 T; 214/75 R; 214/660
[58] Field of Search ............... 214/75 R, 75 G, 75 T, 214/77 P, 660, 701 P

[56] References Cited

U.S. PATENT DOCUMENTS

| | | | |
|---|---|---|---|
| 2,418,494 | 4/1947 | Anthony et al. | 214/75 T |
| 2,426,114 | 8/1947 | Novotney | 214/75 T |
| 3,407,947 | 10/1968 | Valla | 214/141 |
| 3,651,965 | 3/1972 | Simonelli et al. | 214/75 R |
| 3,710,962 | 1/1973 | Fowler, Jr. | 214/75 R |
| 3,907,141 | 9/1975 | Ahrendt et al. | 214/701 P |
| 4,015,725 | 4/1977 | Ryan et al. | 214/75 T |

*Primary Examiner*—Lawrence J. Oresky
*Attorney, Agent, or Firm*—Warren D. Flackbert

[57] ABSTRACT

A platform lift adapted for use on framework disposed within a doorway of a vehicle characterized by a platform and a ramp simultaneously movable by hydraulic means from a stored position to an operative position, and where the hydraulic means further serves to raise and lower the platform. Provision is made for independent manual movement of the platform in the event of any hydraulic failure, adding further utility to the arrangement.

9 Claims, 5 Drawing Figures

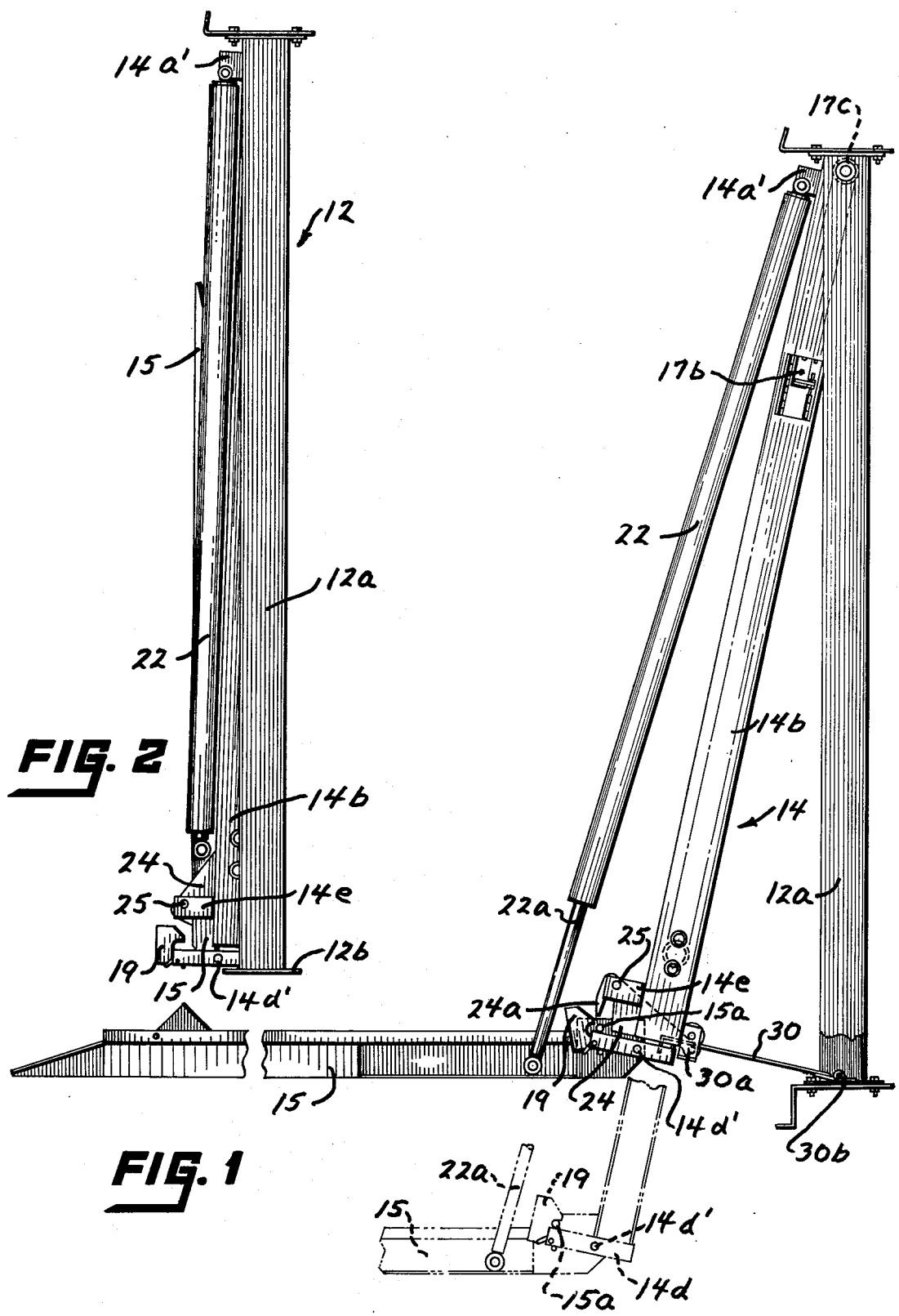

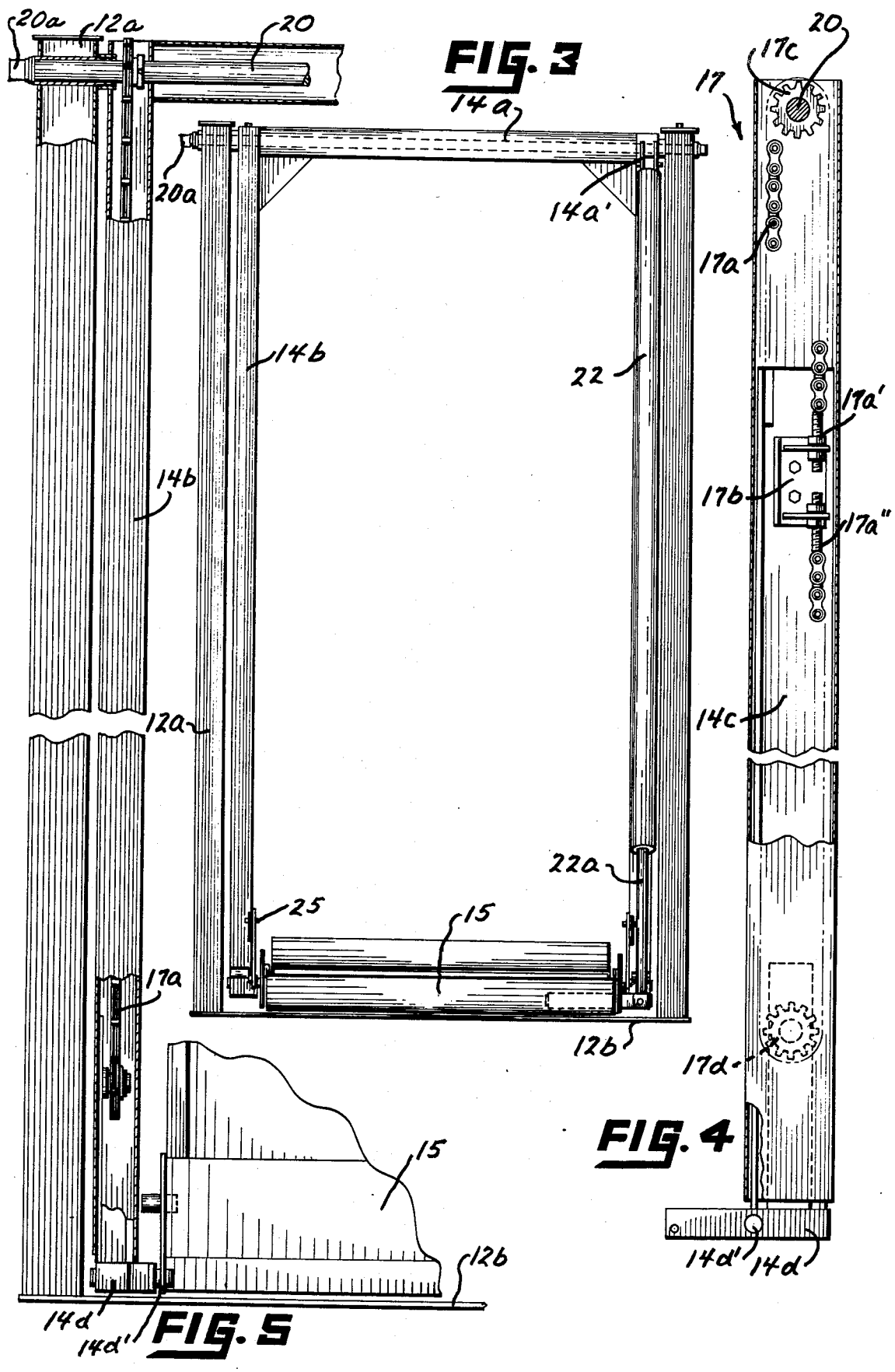

PLATFORM LIFT

As is known, it is desirable to transport individuals confined in wheelchairs in a vehicle, such as a van having a large access door. Loading arrangements formerly in use typically depended upon gravity for lowering the wheelchair receiving platform to ground level and manual operation for raising the platform to the vehicle floor level and for storage. One difficulty, however, with the gravity arrangement was that during cold weather the lubricant employed became sluggish and/or stiff, meaning difficulty in lowering the platform and the added concern of the possible chilling of the individual awaiting transportation.

In the event that a hydraulic arrangement was utilized to achieve operation, it was necessary to employ a hydraulic cylinder for each of the involved functions, oftentimes coupled with manual operation. In contrast, the invention provides a platform lift which is operatively responsive to a single double-acting hydraulic cylinder, and which, at the same time, provides for manual operation in the event the hydraulic system has a failure.

Briefly, the platform lift of the invention is defined by a platform and a ramp mounted on a slide frame disposed within a framework in a doorway of a vehicle. Hydraulic means, in the form of a double-acting hydraulic cylinder, cause the platform lift to move from a stored position within the doorway to an operative position, i.e. where the platform extends outwardly in a generally horizontal plane and the ramp extends between the floor of the vehicle and the platform. As hydraulic movement continues, the platform can be lowered, as to ground level, and thereafter raised beyond the vehicle floor level to a stored position, the ramp simultaneously moving to the stored position.

Importance lies in the provision of a manual arrangement with the elevating system for the platform to permit either raising or lowering action independently of the hydraulic cylinder in the instance of control or other like failure. In other words, the invention not only provides for simultaneous component movement by reason of hydraulic action, as the slide frame, the ramp and the platform, but the important added safety of manual control in the event of hydraulic malfunction.

The platform lift of the invention is readily adapted for use in a wall of a vehicle, is responsive to ready control through conventionally arranged power and switching elements, and affords convenience and positive action not present in arrangements in use heretofore.

A better understanding of the invention will become more apparent from the following description, taken in conjunction with the accompanying drawings, wherein FIG. 1 is a view in side elevation, partly fragmentary, showing the platform lift in an extended or operative position, where the broken-lines represent the platform thereof when lowered;

FIG. 2 is another view in side elevation, in this instance showing the platform lift in a stored position;

FIG. 3 is a view in front elevation, showing the platform lift when in the extended position of FIG. 1;

FIG. 4 is a view in side elevation, looking from right to left in FIG. 3 and partly broken away, showing details of a leveling arrangement within a side of the slide frame; and, FIG. 5 is a fragmentary view in front elevation, showing certain details of the platform lift when in the stored position of FIG. 2.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the platform lift of the invention is used in a doorway of a vehicle, such as a side entry van. The platform lift has a fixed or stationary framework 12 secured within the doorway, such framework 12 being defined by side members 12a resting on a bottom member 12b. The upper ends of the side members 12a support a shaft 20 interconnected therebetween.

A guide frame assembly 14 is pivotally mounted on the shaft 20 between the side members 12a. The guide frame assembly 14 includes a top member 14a and upstanding members 14b, where the latter each have a slide 14c disposed therewithin. A platform 15 is pivotally mounted on pins 14d' extending from blocks 14d secured to the lower end of each slide 14c.

Movement of each slide 14c is achieved through a drive assembly 17 defined by a cable or link chain 17a having ends 17a'-17a" therefore secured to a fixed mounting bracket 17b within the slide 14c. Each link chain 17a travels over a sprocket 17c mounted on the shaft 20 and another sprocket 17d fixed to an inner wall of the slide 14c (see FIG. 4).

When the link chains 17 move by rotation of shaft 20, either hydraulically or manually, the slides 14c and the platform 15 move upwardly or downwardly. In that vertical movement of the slides 14c is coordinated, the platform 15 remains level, i.e. in a horizontal plane, from an operative position at the floor level of the vehicle through a range of positions to the ground level.

In this connection, pins 15a, secured to the platform 15, engage the blocks 14d and serve to establish the horizontal position of platform 15 (see FIG. 1). The maintaining of the platform 15 in such horizontal position is further assured by a latch plate 19, pivotally secured to a block 14d and spring-urged into a latching position (note also the phantom line lowered position of FIG. 1). Thus, when latch plate 19 engages a pin 15a, the platform 15 is prevented from any upward pivoting, except when in the raised position.

A single double-acting hydraulic cylinder 22 is pivotally secured to a bracket 14a' disposed on the top member 14a, where the piston 22a thereof is pivotally secured to the platform 15. The double-acting hydraulic cylinder 22 forms part of a conventional electrohydraulic control arrangement which includes switches for controlling the movement of the platform lift from a stored position to the highest and lowest operative positions, and, as well, a limit switch for assuring safety in operation. The limit switch serves to prevent, for example, the inadvertent closing of the platform 15 upon raising. In any event, importance lies in the use of the single double-acting hydraulic cylinder 22 for performing the functions described below in detail.

When the double-acting hydraulic cylinder 22 is actuated, the platform 15 pivots, on pin 14d', from the stored position of FIG. 2 to the highest horizontal position of FIG. 1, and conversely. It will be apparent that the preceding is accomplished by movement of piston 22a, in either direction, through only a short portion of its overall stroke.

Assuming now that the platform 15 is at the highest horizontal position of FIG. 1, and is being moved to the stored position of FIG. 2, a wedge surface 24a of a lever 24 is engaged by a latch plate 19, moving the latch plate 19 out of engagement with pin 15a. Such disengagement permits platform 15 to pivot upwardly, on pin 14d', as the piston 22a of hydraulic cylinder 22 is further retracted.

As the platform 15 pivots upwardly, pin 15a moves into a slot 24b in lever 24, rotating lever 24 in a counterclockwise direction on a pin 25 mounted on a bracket 14e secured to an outer surface of upstanding member 14b. The opposite end of lever 24 connects to a pin 30a secured to a ramp 30 which, when in an operative position, extends between the floor surface of the vehicle and the platform 15. The ramp 30 is connected to the bottom member 12b of framework 12 through a hinge 30b. Counterclockwise rotation of lever 24 causes the ramp 30 to rotate clockwise at the hinge 30b and to a stored position.

The linkage assembly formed by lever 24 and the ramp 30 acting through pin 25 swings the guide frame assembly 14 into a fully stored position. Thus, as the piston 22a of the double-acting hydraulic cylinder 22 pivots the platform 15 into a stored position, the ramp 30 and the guide frame assembly 14 are each also automatically returned to a stored position.

In order to accomplish movement of the platform lift from a stored position to the operative or uppermost horizontal position of FIG. 1, a reverse component movement is achieved by proper control switching. The result is the provision of a combined platform-ramp arrangement for receiving a wheelchair rolled from within the vehicle.

Referring again to FIG. 1, such represents, as stated, the platform 15 in an uppermost horizontal or operative position. The phantom lines represent the platform 15 at a lowered position, where, usually, the lowest position is at ground level so that a received wheelchair can readily be rolled from the platform lift. The lowering and raising of the platform 15 from the uppermost horizontal position is accomplished by movement of the piston 22a, and the resulting respective extension and retraction of the slides 14c.

An important feature of the invention is the provision for manually raising or lowering the platform 15 in the event of hydraulic or like failure. In this connection, the shaft 20 has a portion 20a extending beyond one surface of a side member 12a. The portion 20a defines a manual lift cam, typically having a surface readily grabbed by a wrench or the like.

After a shut-off valve in the hydraulic system is opened to permit passage of hydraulic fluid from one end of hydraulic cylinder 22 to the other end, the direct rotation of portion 20a, and hence shaft 20, causes the sprockets 17c to rotate and either elevate or lower the slides 14c contained within the upstanding arms 14b. As understood, platform 15 moves with the slides 14c.

From the preceding, it should be apparent that the platform lift of the invention is directly and effectively operated through the use of a single double-acting hydraulic cylinder. The platform lift moves from a stored position within an entry to a vehicle to an operative position at the floor level of the vehicle. Thereafter, the platform lift can be lowered to and raised from ground level. The platform and the ramp are simultaneously moved to and from storage. Moreover, the invention makes provision for added safety in the event of malfunction of the electro-hydraulic system.

The platform lift described hereabove is susceptible to various changes within the spirit of the invention. In this connection, and by way of example, the framework may be reproportioned to adapt to any size vehicle entry opening and other drive chain arrangements employed. Thus, the preceding should be considered illustrative and not as limiting the scope of the following claims:

We claim:

1. A vehicle having a platform lift comprising a framework mounted within the vehicle doorway, a slide frame mounted at its top end on said framework for pivotal movement in a vertical plane between a stored position and an operative position in which the slide frame is pivoted slightly outwardly from said framework, a platform mounted for elevational movement along said slide frame, said platform being pivotal from a substantially vertical stored position to a substantially horizontal operative position, a ramp pivotally connected to the lower horizontal part of said framework and having a width substantially the same width as said platform whereby the ramp forms a continuous support between said platform and said framework, said ramp being pivotal about its pivotal connection from a substantially vertical stored position to a substantially horizontal operative position, a hydraulic cylinder for moving said platform and said ramp to and from said stored and said operative positions and selectively lowering and raising said platform through a range of positions below and to a position disposed adjacent said lower horizontal part, said hydraulic cylinder being connected to said platform at a point spaced outwardly from the pivot point of the platform to said slide frame, locking means on said frame for selectively locking said platform in its horizontal position, and manually operable means for selectively raising and lowering said platform independently of said hydraulic cylinder, whereby upon failure of said hydraulic cylinder the manually operable means may be used to operate said platform.

2. The invention of claim 1 where said hydraulic cylinder pivots said slide frame outwardly from said vehicle doorway to and from a stored and an operative position.

3. The invention of claim 1 where said slide frame includes an upper portion mounted on a shaft supported by said framework and a slideable lower portion supporting said platform, and where flexible means rotating on said shaft control the upward and downward movement of said lower portion and said platform, and where said manually operable means rotate said shaft.

4. The invention of claim 1 where lever means control movement of said platform and said ramp to and from said stored and said operative position.

5. The invention of claim 1 where said hydraulic cylinder is a single double-acting cylinder.

6. The invention of claim 1 where said platform and said ramp move simultaneously.

7. The invention of claim 1 wherein the said locking means maintains said platform in a horizontal position at and below position disposed adjacent said lower horizontal part.

8. The invention of claim 4 where said lever means is pivotally connected to said ramp and to said slide frame, and where said lever means is operatively responsive to movement of said platform.

9. The invention of claim 8 where said lever means rotates in a counterclockwise direction to said stored position and in a clockwise direction to said operative position.

* * * * *

UNITED STATES PATENT AND TRADEMARK OFFICE
CERTIFICATE OF CORRECTION

PATENT NO. : 4,056,203
DATED : November 1, 1977
INVENTOR(S) : Robert D. Meldahl and Raymond L. Smalley It is certified that error appears in the above-identified patent and that said Letters Patent are hereby corrected as shown below:

Column 2, line 37, change "slide 14c (see Fig. 4)" to - - guide 14b (see Figs. 4 and 5) - - . Fig. 1 of the Drawings, add reference character 24b to the slot in lever 24 inside the outer wedge surface 24a.

Signed and Sealed this

Twenty-fourth Day of July 1979

[SEAL]

Attest:

*Attesting Officer*

LUTRELLE F. PARKER
*Acting Commissioner of Patents and Trademarks*